(12) United States Patent
Kmiecik et al.

(10) Patent No.: US 8,326,532 B2
(45) Date of Patent: Dec. 4, 2012

(54) ARRANGEMENT FOR AND METHOD OF TWO DIMENSIONAL AND THREE DIMENSIONAL PRECISION LOCATION AND ORIENTATION DETERMINATION

(75) Inventors: Marcin Michal Kmiecik, Lodz (PL); Krzysztof Miksa, Lodz (PL)

(73) Assignee: Tomtom Global Content B.V., Eindhoven (NL)

( * ) Notice: Subject to any disclaimer, the term of this patent is extended or adjusted under 35 U.S.C. 154(b) by 764 days.

(21) Appl. No.: 12/312,301

(22) PCT Filed: Nov. 6, 2006

(86) PCT No.: PCT/NL2006/000552
§ 371 (c)(1),
(2), (4) Date: Sep. 1, 2009

(87) PCT Pub. No.: WO2008/056972
PCT Pub. Date: May 15, 2008

(65) Prior Publication Data
US 2010/0039318 A1    Feb. 18, 2010

(51) Int. Cl.
*G01S 1/00* (2006.01)
*G01S 5/02* (2010.01)

(52) U.S. Cl. ........ 701/472; 701/468; 701/469; 701/500; 701/518

(58) Field of Classification Search .................. 701/400, 701/408, 466, 468, 469, 472, 500, 518
See application file for complete search history.

(56) References Cited

U.S. PATENT DOCUMENTS

| | | | |
|---|---|---|---|
| 5,311,195 A | 5/1994 | Mathis et al. | |
| 5,446,658 A | 8/1995 | Pastor et al. | |
| 5,906,655 A * | 5/1999 | Fan | 701/472 |
| 5,948,043 A | 9/1999 | Mathis | |
| 6,408,245 B1 | 6/2002 | An et al. | |
| 6,718,248 B2 | 4/2004 | Lu et al. | |
| 6,785,609 B2 * | 8/2004 | Suda | 701/472 |
| 6,792,353 B2 * | 9/2004 | Lin | 701/454 |
| 2002/0165669 A1 | 11/2002 | Pinto et al. | |
| 2006/0265129 A1* | 11/2006 | Moser et al. | 701/214 |

FOREIGN PATENT DOCUMENTS

| | | |
|---|---|---|
| JP | H10-311735 A | 11/1998 |
| JP | 2002-022818 A | 1/2002 |
| JP | 2003-509671 A | 3/2003 |
| JP | 2003-149318 A | 5/2003 |
| JP | 2005-077114 A | 3/2005 |

* cited by examiner

*Primary Examiner* — Hussein Elchanti
*Assistant Examiner* — Rami Khatib

(57) ABSTRACT

In one embodiment of the present invention, a method of and apparatus for determining inaccurate GPS samples in a set of GPS samples is disclosed, according to the following actions: a) obtaining GPS samples as taken by a global positioning system on board a vehicle when traveling along a trajectory; b) obtaining a first estimation of the trajectory based on the GPS samples; c) obtaining a second estimation of the trajectory at least based on measurements made by an inertial measurement unit on board vehicle when traveling along the trajectory; d) comparing the first and second estimations; e) establishing locations where the first estimation shows a variation compared with the second estimation above a predetermined threshold; f) if no such locations can be established continue with action j), otherwise continue with action g); g) removing GPS samples associated with the locations of high variation as being inaccurate GPS samples, thus forming a set of remaining GPS samples; h) calculating the first estimation anew of the trajectory based on the remaining GPS samples and calculating the second estimation anew; i) repeating actions d) to h); j) ending the actions.

21 Claims, 10 Drawing Sheets

ARRANGEMENT FOR AND METHOD OF TWO DIMENSIONAL AND THREE DIMENSIONAL PRECISION LOCATION AND ORIENTATION DETERMINATION

FIELD OF THE INVENTION

The present invention relates to an arrangement for and a method of two dimensional and three dimensional precision location and orientation determination.

PRIOR ART

Position determination devices are known from the prior art. Nowadays they are increasingly applied in, for instance, vehicles such as vehicles, ships and aircraft. To that effect, such a vehicle may comprise different measurement units like a GPS (Global Positioning System), an IMU (inertial Measurement Unit and a DMI (Distance Measurement Instrument).

While travelling, output data of such measurement units is used by a processor to calculate a position and/or orientation of the vehicle. Depending on the application, the measurements made by these measurement units are used on-line or off-line.

It is a general desire to provide as accurate as possible location and orientation measurement from the 3 measurement units: GPS, IMU and DMI. Many problems should be solved to that effect, e.g., multipath problems, noise in the measurement signals and drift (or other shifts) in the output signals of the IMU. In the state of the art, Kalman filters are widely used to compensate for the drift in the output signals from the IMU as well as to compensate for other effects. Also, other statistical methods, like moving averaging techniques and white Gaussian noise filtering, can be used to remove much of the noise from signals to render them clean.

However, some filtering techniques and averaging techniques that are effectively removing Gaussian noise will work ineffectively on offsetted signals that show long time constant shifts to series of measurements, as in GPS measurements.

U.S. Pat. Nos. 5,311,195 and 5,948,043 disclose a GPS system with other sensors and non-Kalman means for identifying inaccurate GPS measurements that should not be taken into account.

SUMMARY OF THE INVENTION

The object of the present invention is to provide a position and orientation determination system and position and orientation determination method to improve at least one of position and orientation calculations based on measurements performed on board a moving vehicle along a trajectory.

To that end, the invention provides a computer arrangement as claimed in the independent apparatus claims.

Moreover, the invention relates to a method as claimed in the independent method claims.

The invention provides a very accurate and reliable way to remove inaccurate GPS samples from a set of GPS samples collected while the vehicle was moving along its trajectory. By using the claimed apparatus or method inaccurate GPS samples are eliminated in a non-linear way.

In an embodiment, the calculations as to position and orientation can be done off-line, i.e., after all measurement data from a trajectory have been collected. This is for instance true in so-called MMS systems (Mobile Mapping Systems) where position and orientation data is collected by a vehicle that travels along a road network, which position and orientation data is later used to produce 2D and/or 3D road maps or to capture geographic data that can be used in a 3D-like display of an area, like a road in a city showing also façades of buildings along the road. Other areas where the invention may be applied are in road asset inventory database creation where MMS systems can provide important support. Other sensors may be used as well, like sensors used for pavement management as geo-radar, laser based roughness coefficient measurement units, stroboscope augmented high speed vertical cameras widely used for crack detection applications, as well as laser scanners for object determination, 3D view application, etc.

The fact that, in such an embodiment, the measured position and orientation data need not be used in real-time but only afterwards, provides an off-line processor with the capacity to perform other correction mechanisms than those that are possible in real time. The off-line method of the invention provides an even more accurate option of examining all GPS samples as collected during travelling along the road network, identifying inaccurate GPS samples and not taking these inaccurate GPS samples into account anymore to calculate the traveled trajectory. The trajectory as calculated in this way has a high accuracy since it is not affected by offsetted GPS signals anymore.

Thus, the invention provides an accurate result which can be implemented quite cost effectively and that can be used in an off-line environment where position/orientation measurements are computed from data collected with a vehicle that has, for instance, been driven along a road in a smooth way (so, no sudden movements as for instance made by a racing vehicle).

In an off-line environment, the invention can be used to produce a more sensitive determination of the trajectory and therefore in the end a slightly more accurate final result. That is because in the off-line embodiment, a shape filter can be applied that is global, recursive, and self adaptive and that can classify GPS samples as being accurate or inaccurate.

In an embodiment, the invention provides the option of calculating the drift (or other shifts) in output signals of an IMU (Inertial Measurement Unit) used to calculate the position and orientation of the vehicle as a function of time. This is done by using the GPS samples and, then, the IMU signal is corrected for the drift determined in this way. The drift corrected IMU signal is, then, used as a main basis for calculating the position and orientation whereas the GPS samples are mainly used for the drift correction. The number of GPS samples used for such a drift compensation may be as high as 25%.

BRIEF DESCRIPTION OF THE DRAWINGS

The invention will be explained in detail with reference to some drawings that are intended to illustrate the invention but not to limit its scope which is defined by the annexed claims and its equivalent embodiments.

In the drawings.

DESCRIPTION OF THE PREFERRED EMBODIMENT

Figure 1:
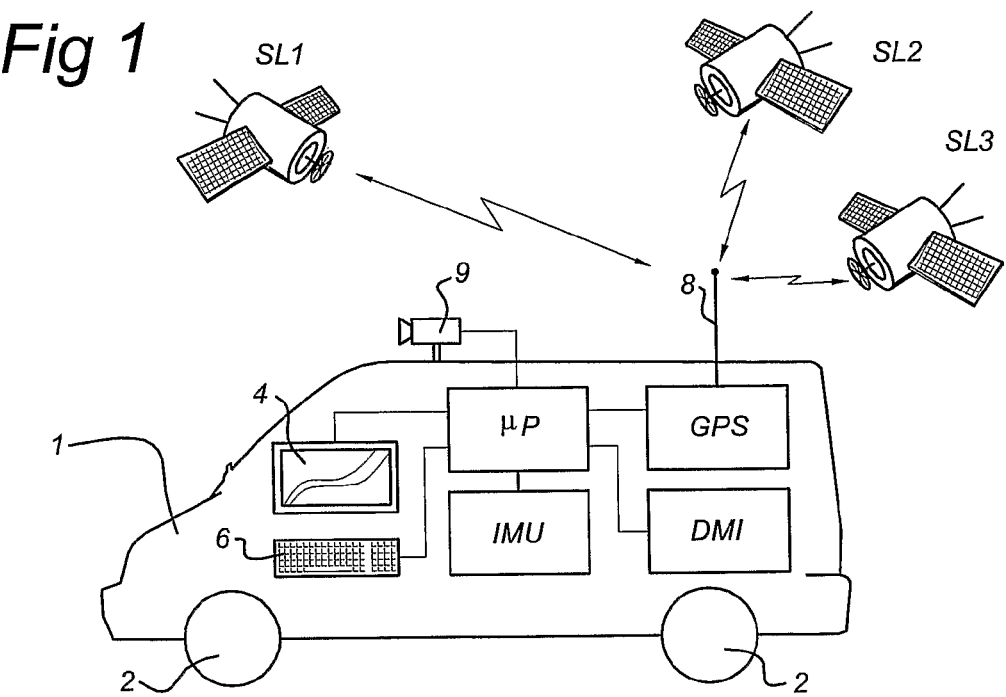
FIG. 1 shows a prior art position and orientation measurement system in a vehicle.

FIG. 1 shows a vehicle provided with an existing high accuracy position determination device. FIG. 1 shows a vehicle 1, provided with a plurality of wheels 2. Moreover, the vehicle 1 is provided with a high accuracy position determination device. As shown in FIG. 1, the position determination device comprises the following components:

- a GPS (global positioning system) unit connected to an antenna 8 and arranged to communicate with a plurality of satellites SLi (i=1, 2, 3, . . . ) and to calculate a position signal from signals received from the satellites SLi. The GPS system also delivers heading data (i.e., direction of travel) and speed of the vehicle 1. The GPS system may be a DGPS system (differential GPS) providing an accuracy of 1 sigma/1 meter (apart from possible white noise). The GPS system is connected to a microprocessor μP that is arranged to process the GPS output signals.
- a DMI (Distance Measurement Instrument). This instrument is an odometer that measures a distance traveled by the vehicle 1 by sensing the number of rotations of one or more of the wheels 2. Thus, the DMI will measure the number of rotations of one of the rear wheels since they do not rotate relative to the vehicle's body. The DMI may operate with a sampling frequency of 10 or more Hz. The DMI is also connected to the microprocessor μP to allow the microprocessor μP to take the distance as measured by the DMI into account while processing the output signals from the GPS unit.
- an IMU (Inertial Measurement Unit). Such an IMU can be implemented as 3 gyro units arranged to measure rotational accelerations and three accelerometers arranged to measure translational accelerations along 3 orthogonal directions. The IMU/gyros and accelerometers may operate with a sampling frequency of 200 Hz. The IMU is also connected to the microprocessor μP to allow the microprocessor μP to take the measurements by the IMU into account while processing the output signals from the GPS unit. It is observed that in some embodiments of the invention, a 1 or 2 axis IMU or a 1 axis gyro and a DMI for 2D positioning support may be sufficient.

The DMI, IMU and GPS systems are connected to a microprocessor μP. The microprocessor μP is used to determine the time a measurement was made by any of these three measurement systems: the microprocessors clock may be used for that purpose. Its linearity may be improved by receiving a PPS signal (PPS=Precise Positioning Service) from a GPS signal. Based on the signals received from the DMI, IMU and GPS systems, the microprocessor μP may determine suitable display signals to be displayed on a monitor 4 in the vehicle 1, informing the driver where the vehicle is located and possibly in what direction it is travelling.

The system as shown in FIG. 1 may be applied in so-called "mobile mapping systems" which collect geographic data, for instance by taking pictures with one or more camera(s) 9 mounted on the vehicle 11. Moreover, one or more laser scanner(s) (not shown in FIG. 1) may be mounted to the vehicle 1. The camera(s) (as well as the optional laser scanner(s)) are connected to the microprocessor μP. The camera pictures as well as possibly other sensor data may be collected along with all DMI, IMU and GPS data for further processing off-line. Another application of the system of FIG. 1 may be in the field of vehicle navigation systems. Nowadays, in vehicle navigation systems, the display signal commonly relates to a position on a 2D (two dimensional) map.

Figure 2A:
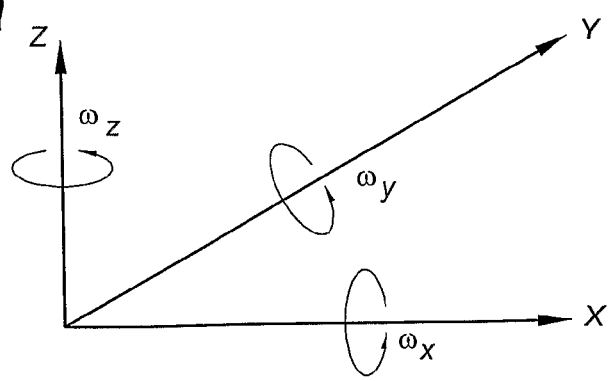
FIG. 2*a* shows a local vehicle coordinate system.

FIG. 2a shows which position signals can be obtained from the three measurement units GPS, DMI and IMU shown in FIG. 1. FIG. 2a shows that the microprocessor μP is arranged to calculate 6 different parameters: 3 distance parameters x, y, z relative to an origin and 3 parameters $\omega_x$, $\omega_y$, and $\omega_z$. Note that the origin of the coordinate system is not fixed but defined relative to the vehicle, for instance, relative to the IMU system. The 3 parameters $\omega_x$, $\omega_y$, and $\omega_z$, respectively, denote a speed of change in the angle (or rotation speed) about the x-axis, y-axis and z-axis respectively. The z-direction coincides with the direction of the local gravity vector. In many situations, the trajectory will have a slope relative to the gravity vector. Then, the x-direction is not perpendicular to the local gravity vector. This coordinate system and measurements can also be used in conjunction with the computing system used offline. Note that the orientation of the vehicle about the y-axis is usually referred to as pitch, whereas the orientation about the x-axis is usually referred to as roll and the heading is the orientation about the z-axis. So, the following equations hold:

$$\text{pitch} = \int \omega_x \cdot dt$$

$$\text{roll} = \int \omega_y \cdot dt$$

$$\text{heading} = \int \omega_z \cdot dt$$

Figure 2B:
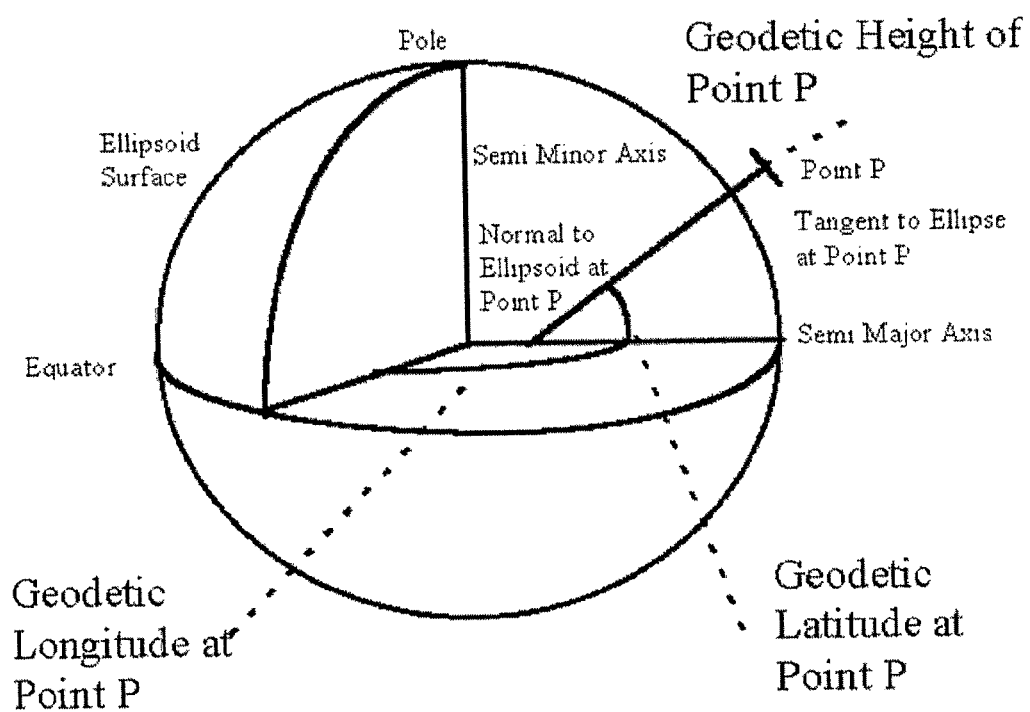
FIG. 2*b* shows a so-called wgs coordinate system.

The used coordinate system is shown in FIG. 2b. Below, it will be explained how processor 11 can determine a latitude, longitude and level above sea and free angles of the vehicle 1 in Geographic Coordinates. The Geographic Coordinate system (GEO) is defined so that its X-axis is in the earth's equatorial plane but is fixed with the rotation of the earth so that it passes through the Greenwich meridian (0° longitude). Its Z-axis is parallel to the rotation axis of the Earth, and its Y-axis completes a right-handed orthogonal set (Y=Z×X). In order to do so, it will be explained how location and orientation of the vehicle with its measurement instruments GPS, IMU, and DMI in a local moving coordinate system as defined by the local Gravity vector are determined.

To that end, the vehicle 1 is arranged at a point with a certain latitude/longitude, with its x-axis parallel to the heading of the vehicle 1 and z-axis parallel to the local gravity vector in that point on earth.

In general the present application can be applied in a vehicle as shown in FIG. 1. However, it may equally well be applied in any other vehicle that is provided with wheels to move along an earth bound trajectory, like a bus, a lorry, a train or a tram, etc. Moreover, the embodiment of method as explained below, which is directed to removing inaccurate GPS samples from the database that stores the GPS samples affected by non-Gaussian noise (which may be offset from true position due to multipath or other reason, i.e., not modeled tropospheric propagation delays) is equally applicable for water based systems (like boats) and airborne systems (helicopters and airplanes) as long as they are equipped with GPS and inertial positioning systems.

Figure 3:
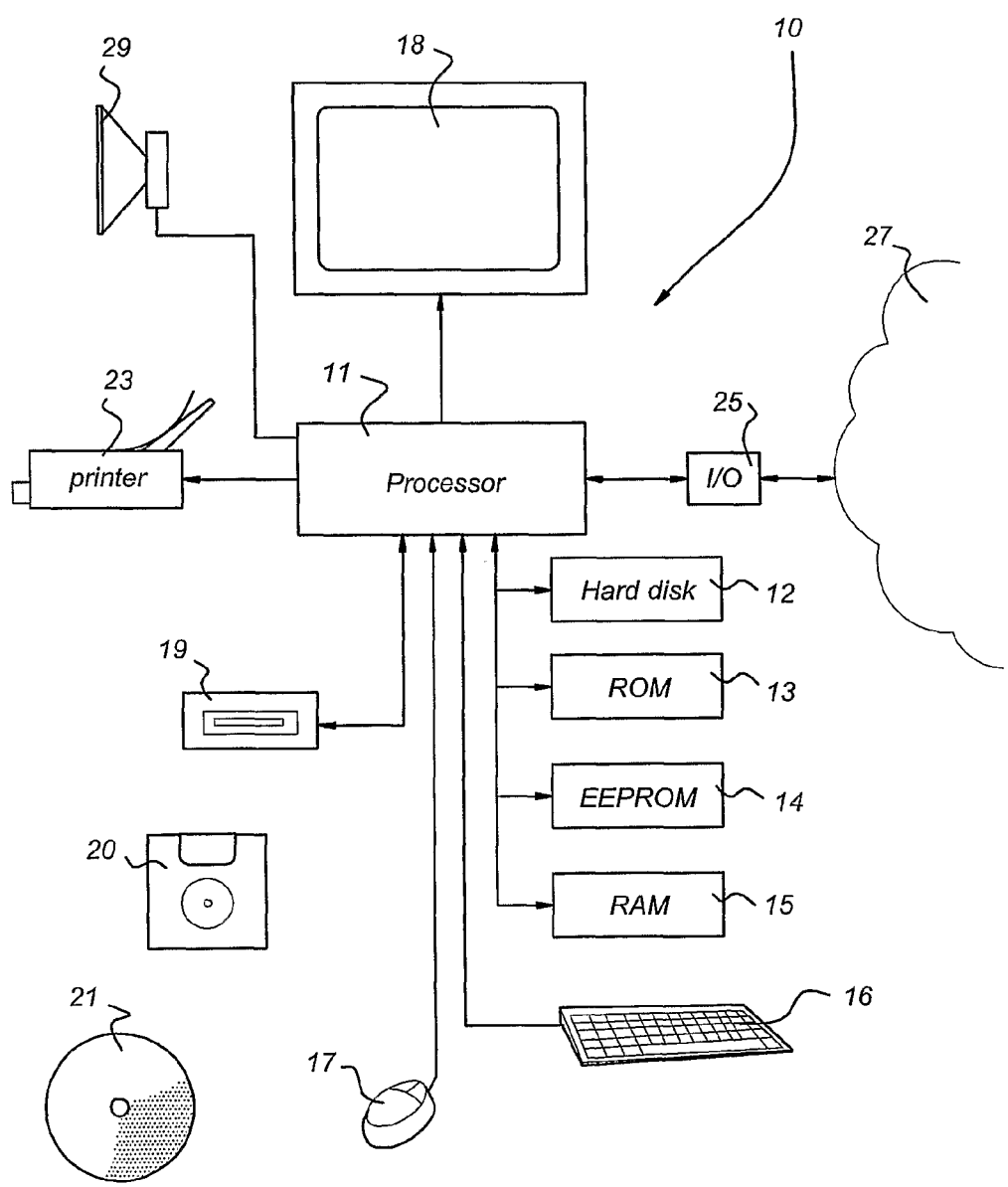
FIG. 3 shows a schematic example of a computer arrangement.

One of the fields in which the invention may be applied relates to producing 3D images of buildings in city streets. To produce such images, MMS (mobile mapping systems) may be used that are driven by drivers through streets of interest. FIG. 1 shows such a MMS system, as has been explained above. The microprocessor μP is arranged to control the cameras 9 such that they take pictures, e.g. at regular intervals in time or distance or at certain heading changes. For some applications, the cameras 9 are directed to the environment in such a way that they can take pictures of façades of building blocks in cities. These façade pictures are, at a later point in time (so, off-line), processed by a separate computer arrangement. FIG. 3 shows such an off-line computer arrangement 10.

It is observed that the pictures may, alternatively, have been taken by one or more cameras aboard an airborne vehicle.

Moreover, it is observed that the MMS system (or airborne system) may also comprise one or more laser scanners that collect laser samples of for instance the buildings, which laser samples are used in the process of mapping the pictures to building façades or a process of identifying road signs.

In FIG. 3, an overview is given of a computer arrangement 10 that can be used to carry out off-line calculations in accordance with the invention. The computer arrangement 10 comprises a processor 11 for carrying out arithmetic operations.

The processor 11 is connected to a plurality of memory components, including a hard disk 12, Read Only Memory (ROM) 13, Electrically Erasable Programmable Read Only Memory (EEPROM) 14, and Random Access Memory (RAM) 15. Not all of these memory types need necessarily be provided. Moreover, these memory components need not be located physically close to the processor 11 but may be located remote from the processor 11.

The processor 11 is also connected to means for inputting instructions, data etc. by a user, like a keyboard 16, and a mouse 17. Other input means, such as a touch screen, a track ball and/or a voice converter, known to persons skilled in the art may be provided too.

A reading unit 19 connected to the processor 11 is provided. The reading unit 19 is arranged to read data from and possibly write data on a data carrier like a floppy disk 20 or a CDROM 21. Other data carriers may be tapes, DVD, CD-R, DVD-R, memory sticks etc. as is known to persons skilled in the art.

The processor 11 is also connected to a printer 23 for printing output data on paper, as well as to a display 18, for instance, a monitor or LCD (Liquid Crystal Display) screen, or any other type of display known to persons skilled in the art. The processor 11 may be connected to a loudspeaker 29.

The processor 11 may be connected to a communication network 27, for instance, the Public Switched Telephone Network (PSTN), a Local Area Network (LAN), a Wide Area Network (WAN), the Internet etc. by means of I/O means 25. The processor 11 may be arranged to communicate with other communication arrangements through the network 27.

The data carrier 20, 21 may comprise a computer program product in the form of data and instructions arranged to provide the processor with the capacity to perform a method in accordance with the invention. However, such computer program product may, alternatively, be downloaded via the telecommunication network 27.

The processor 11 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 11 through the network 27.

It is observed that the arrangement shown in FIG. 3 may also be used for the microprocessor in the vehicle 1, although in the vehicle 1 not all of the components, like the loudspeaker 29 and the printer 23, as shown need to be applied.

In an embodiment, the processor 11 is arranged to receive the pictures as taken by camera's 9 and to store them in one of its memories, e.g., hard disk 12. Hard disk 12 also stores so-called "footprints" of the building blocks from which façade pictures are taken. These footprints comprise 2D data as to the location of the building blocks on earth. One of the memories 12-15 stores a program that can be run by the processor 11 and instructs the processor to combine the façade pictures to the footprints such that the correct façade picture is associated with the correct building block. The data thus obtained is stored for later use, e.g., in a vehicle navigation system to show a driver a 3D view of a street in which he/she is driving. This data can, to that end, be stored on a DVD.

The present invention is not directed to the computer program that can be run by the processor 11 to associate the façade pictures with the footprints. Any prior art (or still to be developed) computer program can be used in the context of the present invention to do so or it can be accomplished with the aid of an operator skilled in the art.

The present invention relates to the location and orientation data associated with for instance façade pictures. In more general terms, the invention relates to data that is collected by some measurement unit(s) where the data is associated with a location and orientation on the earth and this location and orientation is measured at the same time as that other data are measured. The measured data may, e.g., relate to something completely different than façade pictures, like roadside signs for digital maps or soil conditions to search for or explore natural energy sources in the soil (oil, gas, etc.), or cell phone or other RF signal strength measurements. So, the present invention is not restricted in its application as to the types of sensors used on the vehicle 1 to collect data that are relevant at a certain location on the earth. However, for the sake of simplicity, below sometimes the example of collecting façade pictures will be used in explaining the invention.

As will be apparent to a person skilled in the art, the 3D location data relating to each façade picture must be measured by the MMS system as accurately as possible to allow processor 11 to correctly register façade picture data to other available data such as building footprint data. These location data of the façade pictures is directly related to the location and orientation data of the MMS system at the moment each picture is taken by camera(s) 9. So, the location and orientation of the MMS system while taking the façade pictures should be known as accurately as possible. The MMS system, while taking these pictures should, for instance, have an accuracy of 1 to 1.5 meters or better as to its position in x, y, and z, and an accuracy of 0.10 or better as to its angular orientations heading, pitch and roll.

Figure 4:
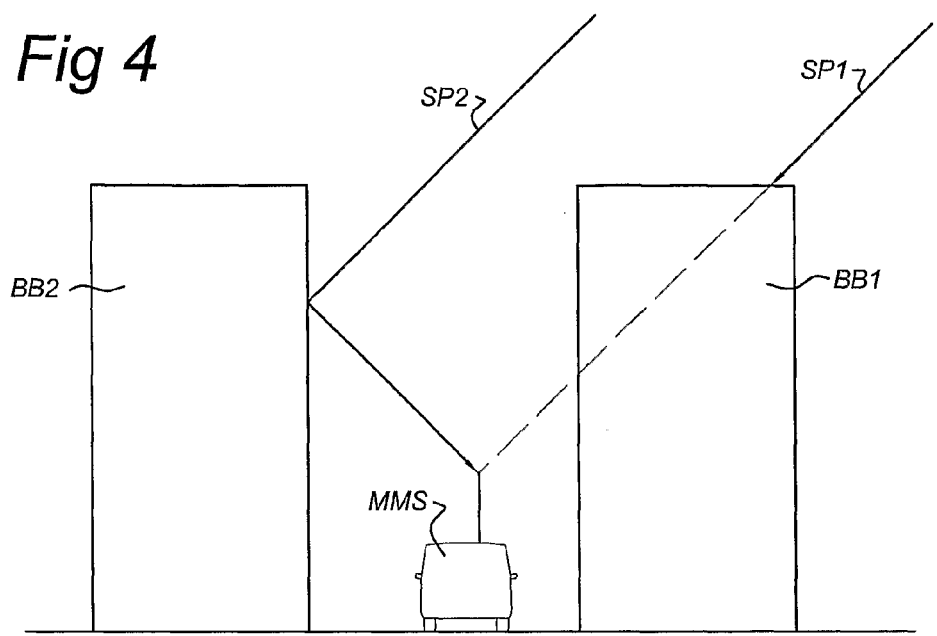
FIG. 4 is a schematic drawing to explain multipath problems.

As known to persons skilled in the art, prior art systems use the GPS part of the system shown in FIG. 1 to derive the position data x, y, and possibly also z. However, as also known to persons skilled in the art, the accuracy of GPS system data is degraded by errors, like multipath errors. FIG. 4 shows the multipath problem in a schematic way.

FIG. 4 shows that the MMS drives in a street between two building blocks BB1 and BB2. A satellite (not shown) transmits location signals to the earth. If a direct, uninterrupted transmission path between the MMS system and the satellite would be available, the MMS system would receive a location signal via signal path SP1 which is along a straight line between the MMS system and the satellite. However, building block BB1 blocks transmission path SP1. However, as shown, the MMS system does receive a location signal from the satellite as reflected by the other building block BB2. However, that location signal has traveled along another path SP2 resulting in an inaccurate location measurement as dependent on the satellite concerned.

In real situations, the location signal from the satellite will often be received by the MMS system via multiple paths. In many occasions, the direct path SP1 and multiple paths via reflections against building blocks and trees etc. are present. One such source of reflections is, for instance, formed by large trucks passing by the MMS system. Prior art solutions are provided to cope with the multipath problem, e.g., in the form of Kalman filters, suitable statistical calculations, averaging over time, etc. Other sources of multipath errors may relate to thunderstorm clouds or other ionospheric reflections. The examples of multipath errors mentioned here are not intended to be exhaustive. However, especially in land-based applications on public roads trucks, surrounding buildings, signage and moving vehicles create complicated and fast changing local configurations. In such situation, standard methods of multipath determination based on longer time observations may well fail.

Now, it will be explained how location and orientation measurement data as collected by at least one of the two other systems IMU and DMI (FIG. 1) can be used to decide which GPS measurements are probably accurate and which ones are probably inaccurate (with respect to a required accuracy) and should not be taken into account in any later location calculation, as for instance performed by processor 11 (FIG. 3). Below, the way this is done will first be explained with reference to a 2D situation, i.e., a situation where neither the height z nor the pitch and roll, but only x, y and heading are taken into account. Only after that a 3D example will be given.

Calculating a 2D Position and Orientation.

Figure 5:
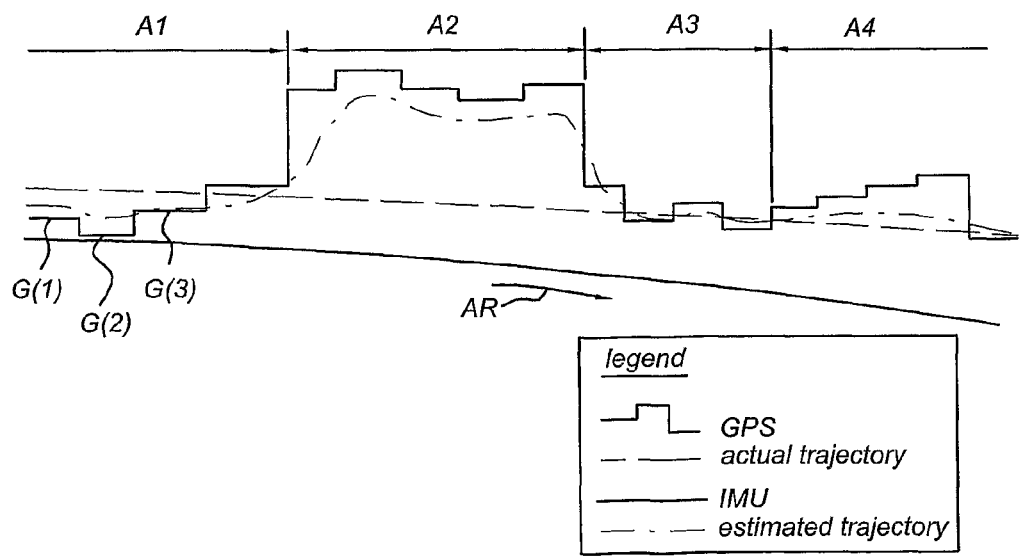
FIG. 5 shows a diagram showing output signals of a GPS system and an Inertial Measurement Unit (IMU)

FIG. 5 shows, in a schematic way, four successive areas A1, A2, A3, A4 in which a MMS system has traveled along a road. FIG. 5 is a schematic top view of a road surface (not to scale) indicating how vehicle 1 would have traveled according to different measurement sources. FIG. 5 shows that the MMS system has traveled in a direction as indicated with arrow AR. The dashed line in FIG. 5 indicates the true trajectory as traveled by the MMS system.

In all four areas A1, A2, A3, A4 the MMS system has collected GPS samples in order to measure its 2D location and orientation during the taking of consecutive façade pictures. The trajectory as traveled according to the GPS samples is indicated with G(i), i=1, 2, 3, . . . , I. There may be 5 or 10 or even more GPS samples per second, however, the invention is not restricted to this number.

FIG. 5 shows the GPS samples in a very schematic way. I.e., they are shown as consecutive steps. In reality, each step is one sample, where there is a sampling time between successive samples.

Moreover, the IMU system has measured the trajectory as traveled by the MMS system. The trajectory as calculated by the IMU system is indicated with a solid line. Recall that the IMU is a relative position and orientation measuring device and needs an absolute reference to place it in relation to the trajectory. In this example the pure IMU position is arbitrarily placed near the true trajectory at the start (left side) of the trajectory. This solid line is indicated to deviate more and more from the true trajectory during the movement of the MMS system over time. This is due to drift or other uncalibrated shifts in the calculations made by the IMU system.

Such shifts/drift is caused by the fact that the IMU only provides a relative and not an absolute measurement. The error caused by drift can be explained as follows.

As indicated above, the IMU system provides data from which the following parameters can be deduced:

speed of rotations about the x-axis, the y-axis and the z-axis, i.e., $d\omega_x/dt$, $d\omega_y/dt$, $d\omega_z/dt$ (FIG. 2a);

$a_x$, $a_y$, and $a_z$, i.e., accelerations in directions x, y, and z, respectively.

For calculating the location and orientation in a 2D space, the accelerations $a_x$ and $a_y$ in the x, and y directions, as well as the speed of rotation about the z-axis, i.e., $\omega_z$, are used. From these accelerations the positions x, and y and heading can be calculated as follows:

$$x = \iint a_x \cdot dt^2$$

$$y = \iint a_y \cdot dt^2$$

$$\text{heading} = \int d\omega_z/dt$$

Normally, calculating an x, y position and heading from these accelerations is not accurate enough over time, due to drift in the output signal which represents an error which then accumulates by virtue of the double integration. Such a drift may typically be in the order of 1 m per traveled km. Below, the term drift will be used to refer both to the kind of drift as explained with these equations as well as other kinds of shifts due to accumulated errors in the output signal of the IMU system.

Finally, the dash-dot curve in FIG. 5 shows an estimated trajectory as traveled by the MMS system based on the GPS true heading measurements samples G(i) and local distances between close in time GPS probes, as well as the IMU measurements and the DMI measurements.

As one can see from FIG. 5, in area A4 the GPS system shows a gradually increasing deviation between the estimated trajectory and the GPS output. This may be caused by all kinds of errors as will be evident to a person skilled in the art.

Moreover, FIG. 5 shows that the GPS measurements show sudden shifts in its output at the transitions between area A1 and A2, and between A2 and A3 (note that FIG. 5 only shows some GPS samples. In reality, the number of GPS samples in an area like area A2 may be much larger). Such sudden shifts may be an indication of multipath errors. However, one cannot simply state that the GPS measurements in areas A2 and A4 are inaccurate due to multipath errors. It may equally well be that the GPS samples in areas A1 and A3 are inaccurate due to multipath errors. In addition, one cannot a priori rely on the absolute values for x and y in these areas as measured by the IMU system since they show an unknown drift, as explained above and need some absolute reference. Yet, the IMU output data can be used to find which GPS samples are inaccurate and which ones are not. Then, the inaccurate GPS samples can be removed such that a set of accurate GPS samples remain. This set of reliable GPS samples can then, in turn, be used to establish an absolute position for the IMU and to calibrate the IMU output data, i.e., to estimate the drift in the IMU output data and remove that drift from the IMU measurements resulting in an overall accurate position determination. This will be explained in detail below with reference to FIGS. 6, 7a-7d, and 8a-8c.

Figure 6:
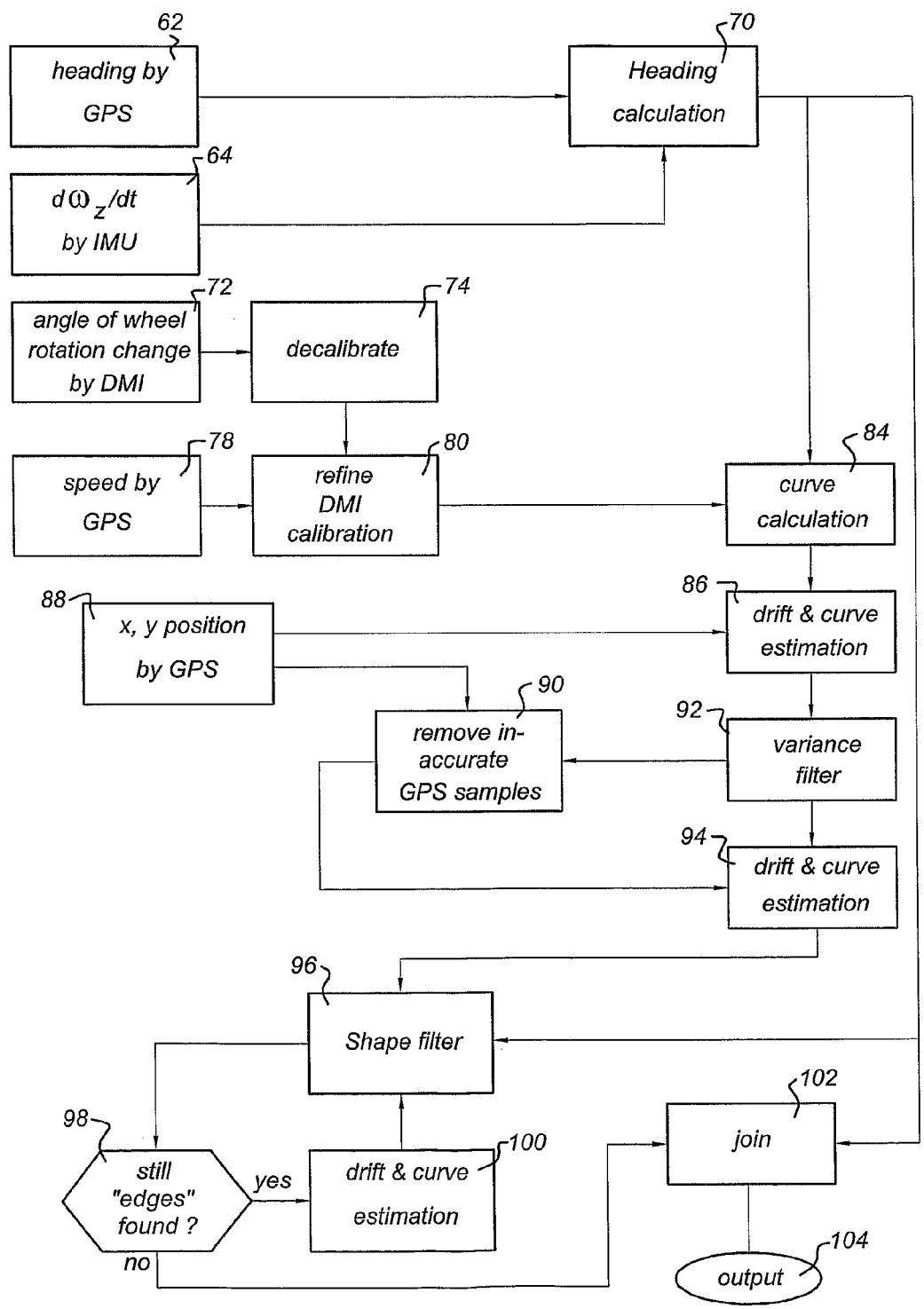
FIG. 6 shows a flow chart to explain the present invention.

FIG. 6 shows a flow chart of actions that may be performed in accordance with the invention. These actions are performed by processor 11 and are directed at solving both the multipath problems in area A2 and the deviations shown in area A4.

Figure 8A:
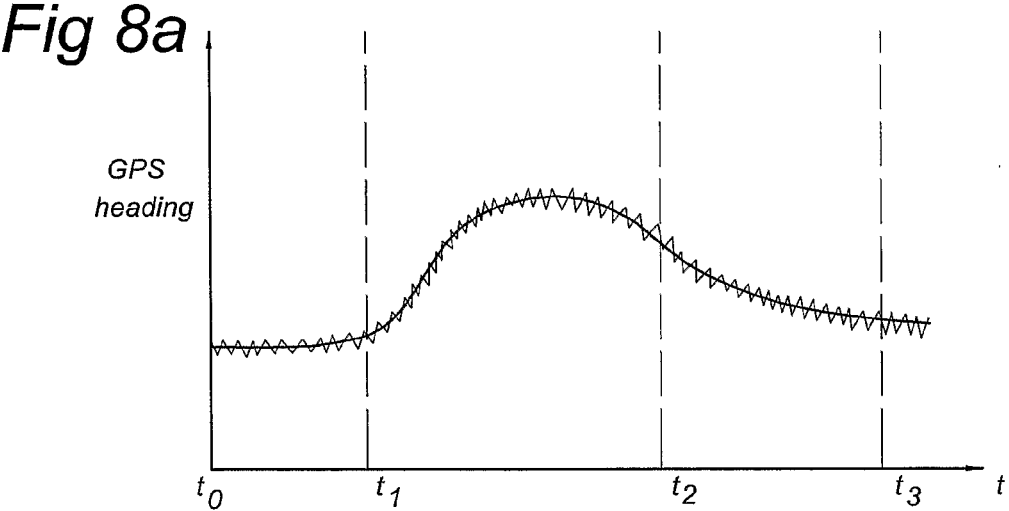
FIGS. 8a, 8b and 8c show curves to clarify how drift (and other shifts) in IMU signals can be estimated.

In action 62, the processor 11 obtains the heading of the vehicle 1 as a function of time as measured by the GPS system. This is, here, referred to as "GPS heading". FIG. 8*a* shows an example of such a GPS heading during a period t0-t3. Note that the GPS measurement suffers from noise as indicated by the small high frequency variations in the curve.

Other data obtained by processor 11 from the GPS system includes the x, y position of the vehicle 1, as indicated in action 88. From these x, y positions a speed of the vehicle 1 can be derived, as indicated in action 78. As known from the prior art, all these measurement data are statistically uncorrelated.

In action 64, the processor 11 obtains the speed in the rotation $\omega_z$ as measured by the IMU system along the trajectory traveled by the MMS system and delivers the heading of vehicle 1 as calculated by the integration explained above.

In action 72, the processor 11 obtains the values of the wheel angles of the MMS system as measured by the DMI system as a function of time along the trajectory traveled by the MMS system.

For the purpose of calculating position and orientation in the 2D plane, the vehicle 1, which in most cases has a mass of more than 1000 kg, is considered to behave as a low pass filter. So, it is assumed that no rapid changes in the trajectory traveled by vehicle 1 will be observed while the vehicle 1 is moving. Moreover, the vehicle 1 is assumed to behave as a fixed frame.

The DMI sensor is, for instance, mounted to a rear wheel of vehicle 1. Therefore, the position fluctuations of the DMI in the 2D plane relative to the mass center of the vehicle 1 are minimal and the fluctuations in its output can be considered to be white noise with an amplitude which is much less then the fluctuations in the GPS signal. Therefore the fluctuations in the DMI output may be neglected in the calculations.

From vehicle dynamics modelling, it is well known that vehicle body angles against the local gravity vector are proportional to the vehicle's accelerations. This is true in "normal" conditions, i.e., for instance, the vehicle is not involved in an accident, the driver drives the vehicle in a quiet smooth way (no powerful driving style) in a forward direction (braking, speeding with a same proportionality factor).

Under these assumptions, the following equation is valid:

$$\text{"MC Trajectory"} = \text{"V Reference Trajectory"} + \text{"MC Oscillations"} \quad (1)$$

where:
MC Trajectory=trajectory as traveled by mass centre of vehicle 1;
V reference trajectory=reference trajectory traveled by vehicle 1, as derived from the GPS system;
MC oscillations=local differences between the reference trajectory as traveled by vehicle 1 and mass centre of vehicle 1; the amplitude of the MC oscillations is expected to be in the range of 0.1 m and can be considered to be white noise for determination of the trajectory.

As the vehicle body can be considered to be a fixed frame, all points of the vehicle body share the same orientation (i.e., have the same roll, pitch and heading) as the mass centre of vehicle 1. Thus, the position of vehicle 1 can be determined as a 3D displacement vector of the position of the mass centre of vehicle 1.

In an embodiment, instead of using the centre of vehicle 1 as the centre of the local coordinate system, the position of GPS antenna 8 is used as the centre in the local coordinate system. The advantage of doing so, is that the mass centre need not be determined which facilitates the calculations.

Now, the following actions are performed by processor 11.

In action 70, the processor 11 performs a local linear regression on the heading of vehicle 1 as derived by the IMU system in order to obtain a smoothened local average value of the heading along the trajectory. In this process, the processor 11 uses multiple GPS samples, after removal of non-Gaussian noise in the GPS samples. This delivers an accurate "true" heading of the vehicle 1 with a precision that may be below 0.1 degrees. The output of action 70 is the heading of vehicle 1 as a function of time.

In action 74, the processor 11 performs a decalibration of the wheel angle rotations as delivered by the DMI. This renders the distance as traveled by that wheel. The result of action 74 is an estimation of the distance traveled by the MMS system as a function of time based on the DMI measurement. That distance is, here, referred to as "DMI distance".

In action 80, the speed as measured by the GPS system is used by processor 11 to dynamically calibrate this DMI distance. Thus, in action 80, processor 11 produces an estimated "true" traveled distance as a function of time.

It is observed that dynamically calibrating DMI measurements with GPS speed measurements is normally more precise in determining a "true" traveled distance than obtaining that value from the IMU system as the DMI system is less affected by inertial distortions.

Both the output of action 80 and the output of action 70 are input to a next action called "curve calculation" 84. In this curve calculation action 84, the following equation is used:

$$\text{INS\_Trajectory2D} = \text{Traj\_true2D} + \text{IMU\_drift2D} + \text{IMU\_noise} \quad (2)$$

where:
INS_Trajectory2D=curve as traveled by vehicle 1 as calculated from the measurements made by the inertial navigation system INS which includes the IMU, DMI and GPS units. This is the output of action 84;
Traj_true2D=vehicle reference trajectory in 2D plane, i.e., the trajectory as really traveled by vehicle 1.
IMU-Drift2D=the drift as caused by the IMU system measurement. In practice, "IMU-Drift-2D" will be a slowly changing function over time 2D;
IMU_noise=noise in IMU system measurement.

INS_Trajectory2D in equation (2) corresponds to the "estimated trajectory" in FIG. 5.

Over small distances, the following equations are valid:

$$\text{INS\_Trajectory2D} = \text{Traj\_True2D} + \text{IMU\_drift2D} + \text{IMU\_noise(small)} \quad (3)$$

$$\text{Traj\_true-2D} = \text{GPS\_meas2D} - \text{GPS\_noise} - \text{GPS\_multipath} \quad (4)$$

where:
GPS_meas2D=measured position signal as derived from GPS system
GPS_noise=noise in GPS_meas from GPS system as would be present if there are no multipath errors. Note that any Gaussian noise can be minimized from the GPS samples. Any known method to do so can be used. However, apart from Gaussian noise, other noise may still remain.
GPS_multipath=errors in GPS_meas due to multipath problems Now, from equations (3) and (4) one can derive:

$$\text{IMU\_drift2D} = \text{INS\_Trajectory2D} - \text{IMU\_noise} - [\text{GPS\_meas2D} - \text{GPS\_noise} - \text{GPS\_multipath}] \quad (5)$$

Now, equation (2) is redrafted in the following form:

$$\text{Traj\_true2D\_approx} = \text{INS\_Trajectory2D} - \text{IMU\_drift2D\_approx} \quad (6)$$

where all parameters have the same meaning as in equation (2) and the addition "approx" refers to the parameter having an approximated value. Equation (6) is the equation associated with action 86. Moreover, equation (5) can be used to make a first estimation of the drift (IMU_drift2D) caused by the IMU system. I.e., one estimates that IMU_drift2D is roughly equal to:

$$\text{IMU\_drift2D} \approx [\text{IMU\_meas2D} - \text{GPS\_meas-2D}] \quad (5a)$$

where:

IMU_meas2D=heading of vehicle as measured by the IMU system.

Figure 8B:
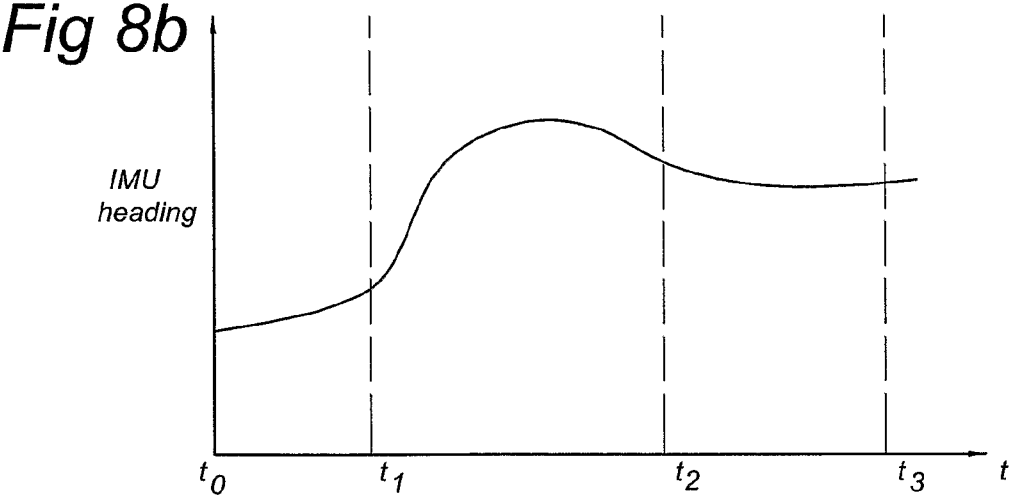

This can be explained with reference to FIGS. 8a-8c as follows. FIG. 8a shows the heading of vehicle 1 as measured by the GPS system. The signal shown in FIG. 8a may still have (Gaussian) noise on it. FIG. 8b shows the same heading but then as derived from the IMU system. The heading as derived from the IMU system has a drift relative to the real heading.

Figure 8C:
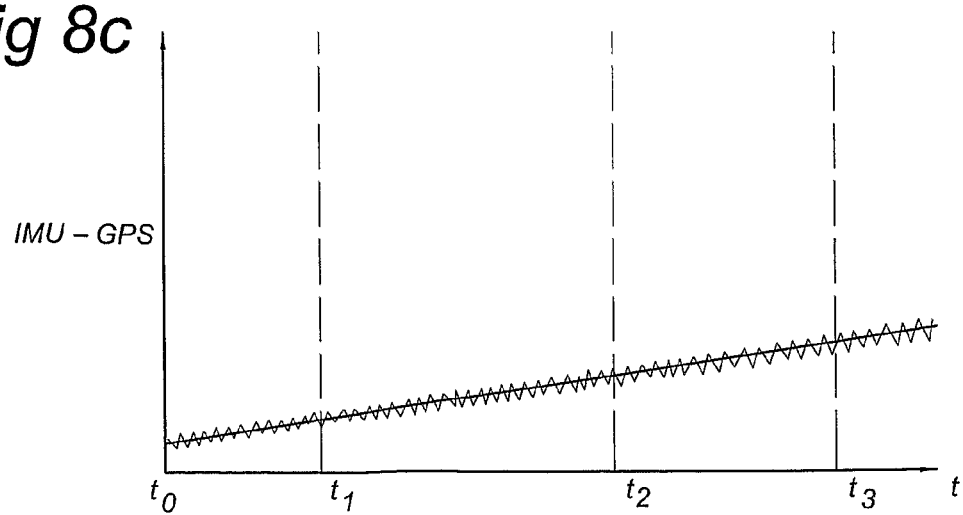

FIG. 8c shows a curve resulting from subtracting the curve of FIG. 8a from the curve of FIG. 8b. The resulting curve is a substantially straight line with an offset to the origin. The angle of the curve corresponds to the first order and major component of the drift in the IMU system as a function of time. The curve still shows some (Gaussian) noise on it caused by the GPS system. However, this can easily be filtered out by any method known from the prior art. The remaining errors will be due to multipath which are identified as explained hereinafter.

Of course, when the measured GPS signal is still containing errors due to multipath problems and non-Gaussian noise, these errors will also be visible in the curve of FIG. 8c. So, the method as explained with reference to FIGS. 8a-8c will only render a proper estimation of the drift in the IMU system once all errors in the GPS signal due to multipath and non-Gaussian noise have been removed. So, when used in action 86 the result is still very inaccurate. Still, the method can be used in an iterative way once more and more inaccurate GPS samples are removed from the GPS measurement. This will be explained below.

Combining equations (5) and (6) renders:

$$\text{Traj\_true2D\_approx} = \text{Traj\_meas2D} - \text{EQ}$$
$$[\text{GPS\_meas2D} - \text{GPS\_noise} - \text{GPS\_multipath} -$$
$$\text{IMU\_meas2D}] \quad (7)$$

where EQ[ . . . ] refers to a time series equalization of the parameters, i.e. determining a moving average (or any other low pass filter) over a predetermined number, for instance 100, of samples, between [ . . . ].

It is observed that all these 2D signals can be considered as parametrical time series having components both in the x and y direction. So, the positioning problem is decomposed to a series of 1 dimensional problems of time series equalization.

As one can see from equation (7), a problem now is that for calculating EQ[ . . . ] one needs to know both GPS_noise and GPS_multipath-IMU_meas2D. The equation will work fine if both of these parameters can be filtered out from the GPS measurements. This can be done in an iterative process as follows.

First of all, as indicated in action 92, processor 11 applies a local variance filter such that it tests whether:

$$|\text{GPS\_meas2D} - \text{Traj\_true2D\_approx}| > \text{Threshold} \quad (8)$$

where GPS_meas2D is formed by all GPS samples.

This "Threshold" is for instance equal to the average variance value for variance measure for GPS set GPS. The local variance may be calculated for a range of several, for instance 20 to 10, GPS samples.

FIGS. 7a-7d show how such a variance filter may work when applied to the example shown in FIG. 5.

Figure 7A:
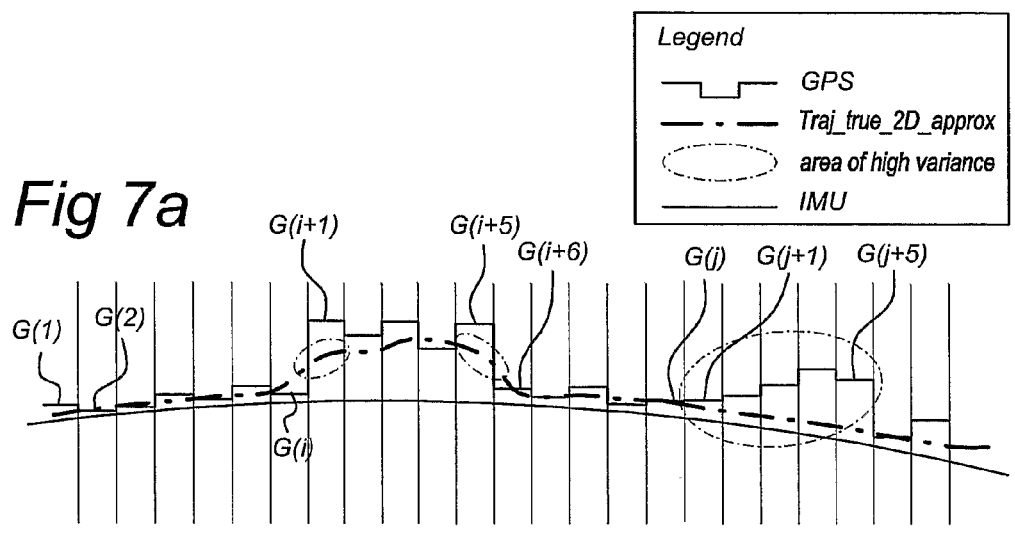
FIGS. 7a-7d show successive actions in a method to remove inaccurate GPS samples from a set of GPS samples.
Figure 7B:
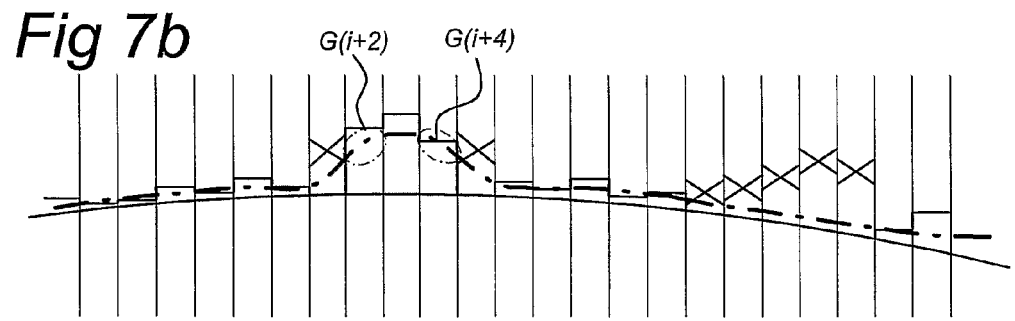

FIG. 7a shows several curves that correspond to the ones shown in FIG. 5 (be it that the actual trajectory is missing). A first curve shows a block shaped signal denoting the trajectory from a top view as traveled by vehicle 1 according to a plurality of consecutive GPS samples G(1), G(2), G(3), . . . . As can be seen from FIG. 7a, there is a large transition between the GPS samples G(i) and G(i+1), between G(i+5) and G(i+6) and between G(j+6) and G(j+7). Moreover, there is a gradual changing transition starting at G(j+1). Large transitions may be due to multipath errors. However, based on the GPS samples only, one cannot decide which ones are relating to erroneous measurements due to noise/multipath problems and which ones are correct.

A second curve in FIG. 7a is a solid line which refers to the trajectory as calculated from the IMU measurements $a_x$ and $a_y$. This IMU line has a drift (typically 1 m per 1 km) but the exact drift value is unknown.

A third curve in FIG. 7a is a dashed line which is the new calculated curve of action 86 (i.e., equation (6) above).

Now, in action 92, processor 11 performs a variance filter, i.e. processor 11 compares the GPS line with the dashed line of FIG. 7a in the way as explained with reference to equation (8). As may be evident from FIG. 7a, this renders areas with high variance. Note that the term "variance", in this description refers to a difference between two different signals and not to a difference between consecutive samples in the same signal. These areas are indicated with dot-dash circles in FIG. 7a. So, first of all, this delivers the samples G(j+1) to G(j+5) as having such a high variance that they should not be used anymore in the calculation of the trajectory as traveled by vehicle 1. Secondly, this delivers samples at the transition between G(i) and G(i+1) as having too high a variance. So, samples G(i+1) should not be used anymore either. The same holds true for sample G(i+5). So, the result of applying the variance filter is that samples relating to noise (i.e., G(j+1) to G(j+5)) are not used anymore, as well as GPS samples at transitions due to multipath errors (i.e., G(i+1) and G(i+5)).

Here, the assumption is that the comparison with the approximated trajectory line Traj_true-2D_approx is a fair comparison which is not affected too much by any drift problems caused by the IMU system since the influence of the drift in the IMU signals is small enough to be neglected over such small time periods as a few adjacent GPS samples.

In action 90, the processor 11 now removes the GPS samples as found by the variance filter from the set of GPS samples (they may be kept in memory but are not taken into account anymore). This is indicated with crosses in FIG. 7b. This renders a new set of GPS samples.

It is observed that, in an embodiment, at a later action in time, processor 11 may look for which are the best samples of the removed GPS samples and to add them to the set of accurate GPS samples again. This may take some time of the processor 11 but may also improve the approximation of the trajectory. Especially after having removed many GPS samples, recursively adding such GPS samples again to the set may significantly reduce spaces without any GPS samples. This can make the method more accurate.

In action 94, this new set of GPS samples is used to make a new estimation of the trajectory Traj_true2D_approx as traveled by vehicle 1. The new estimated trajectory is indicated with a dot-dash line in FIG. 7b. Moreover, the drift as caused by the IMU data is estimated again in accordance with equation (5a).

In action 96, the processor 11 applies a "shape filter" to detect GPS samples in the set of remaining GPS samples after action 92 and to exclude them from calculating the trajectory Traj_true-2D_approx. In this "shape filter" equation (8) is applied again but then to the newly calculated trajectory from action 94 and a more sensitive Threshold This action will render new GPS samples showing a high variance: in FIG. 7b this will identify for elimination the GPS samples G(i+2) and G(i+4). The processor 11 removes these GPS samples G(i+2) and G(i+4) from the set of GPS samples that remained after action 94.

Figure 7C:
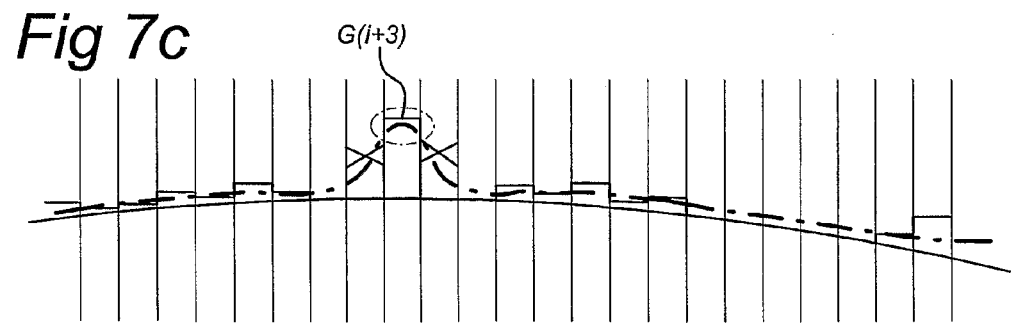
Figure 7D:
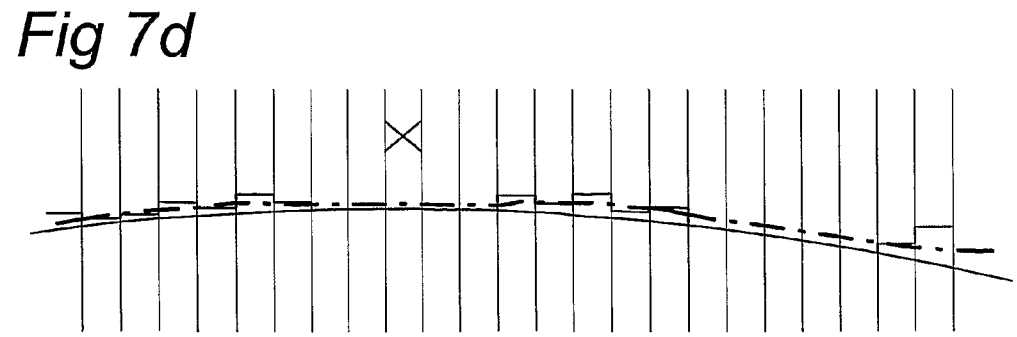

As shown in FIG. 7c, in action 98, the processor 11 checks whether such GPS samples with high variance were found in action 96. If so, the processor continues with action 100. If not, the processor 11 continues with action 102.

In action 100, processor 11 again calculates a new estimated trajectory Traj_true2D_approx (indicated with the dot-dash line in FIG. 7c) while using the remaining GPS samples. Using this newly estimated trajectory Traj_true2D_approx, again the drift as caused by the IMU system is calculated in accordance with equation (5a).

Thus, due to the test in action 98, as long as GPS samples with high variance are found in the iteratively new estimated trajectory Traj_true2D_approx, GPS samples with such high variance are removed. If no such GPS samples with high variance are found anymore, as checked in action 98, the processor continues with action 102. In action 102, the processor 11 joins the resulting estimated trajectory Traj_true2D_approx with the heading of vehicle 1 as a function of time (and thus as a function of location on the trajectory).

So, after the processor 11 has performed the actions of the flow chart shown in FIG. 6 the trajectory traveled by the MMS system in a 2D plane is known. I.e., the processor 11 has calculated x, y and the heading as a function of time.

Note that the process of the invention makes use of a sequence of measurements before a best estimate of the trajectory is found. In a real time application, a sequence of measurements only has past measurements to take into account. While this invention could be suitably modified to apply in a real time application the full benefit is mainly achieved when the iterations allow processing of points in the past and also in the future with reference to any particular point. For this reason the invention is considered primarily for offline applications.

Remarks and Alternatives.

The following observations are made.

The method as explained with reference to FIGS. 8a-8c to estimate drift in the estimated trajectory due to the drift in output signals of the IMU system can also be used to directly estimate the drift in the orientation output signal of the IMU system as available after action 66. To that end, the orientation signal as a function of time as available from the GPS system after all inaccurate GPS samples have been removed is subtracted from the orientation signal of the IMU system. This will render a signal similar to the one shown in FIG. 8c showing the drift in the IMU signal as a function of time.

In some occasions, multipath problems may relate to a large number of GPS samples. Then, GPS samples outside the area of the multipath may be affected by the multipath too. Therefore, processor 11 may also remove some GPS measurements outside the multipath area, for instance 20 GPS samples before and after that area.

The "shape filter", in order to properly detect differences in shape in the surrounding of "point" in the GPS curve, has to seek a compromise between the following trade-off requirements:
1. the filter shall consider as many points as possible (in travel distance)
2. the filter shall detect short shape anomalies in the GPS curve as well.

Multiple methods known from prior art can be used to build such a filter.

The window sample sizes used for both the variance filter and shape filter may be variable and calculated by means of traveled distance according to DMI measurements, for instance not less then 100 m (or any other value) in both time directions, to remove effects of vehicle stops.

As indicated in actions 84, 86, 94 and 100, the processor 11 calculates an estimated curve of the trajectory traveled by the MMS system. This may be done in accordance with any method known from the prior art. However, in an embodiment, the method as explained with reference to FIGS. 9a and 9b is used.

Figure 9A:
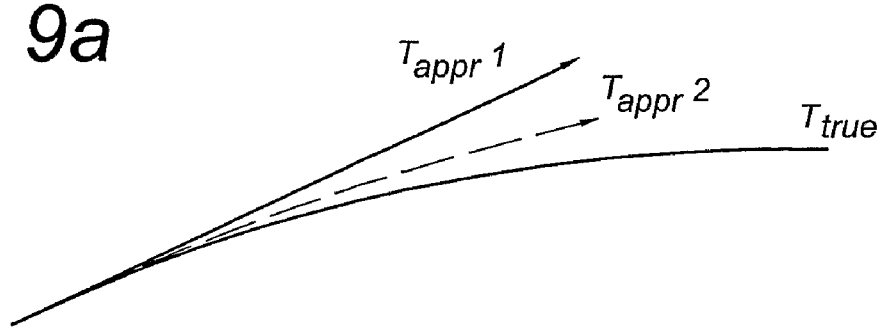
FIGS. 9a and 9b show how trajectories traveled by a road vehicle can be approximated by clothoides.

FIG. 9a shows a trajectory Ttrue that is traveled by the MMS system. However, the output of action 70 providing the calculated heading as a function of time is only in the form of a finite number of samples (the IMU system provides for instance 200 samples per sec and the GPS system 5 samples per sec). So, the real trajectory as traveled by the MMS system should be approximated from these orientation samples as a function of time and from the calculated distance as is the output from action 80. A very usual way of calculating such an approximated trajectory known in the art is shown with arrow Tappr1. Arrow Tappr1 indicates a calculation based on linearly interpolating between successive calculated points P on the trajectory. However, as one can see from FIG. 9a, this only provides a first order approximation which may not be very accurate when the MMS system was driving in a curve.

An alternative way of calculating an approximated trajectory between successive points P is indicated with trajectory Tappr2 in FIG. 9a. Trajectory Tappr2 is itself curved and based on interpolating between successive points on the calculated trajectory based on clothoide curve portions. FIG. 9b shows the definition of a clothoide curve form. I.e., a curve is said to have a clothoide form when the curve has a distance R to a fixed point R0 and that distance R reduces with an amount corresponding to 1/R when one travels a distance D along the curve towards fixed point R0. So, in FIG. 9b, the distance R1 reduces to R2=R1−a/R after having traveled a distance D, and to R3=R2−a/R2 after having traveled a further distance D. The exact curvature of the clothoide portion used between two successive points P depends on the amount of curvature of the trajectory as calculated for the trajectory preceding the points P.

Figure 9B:
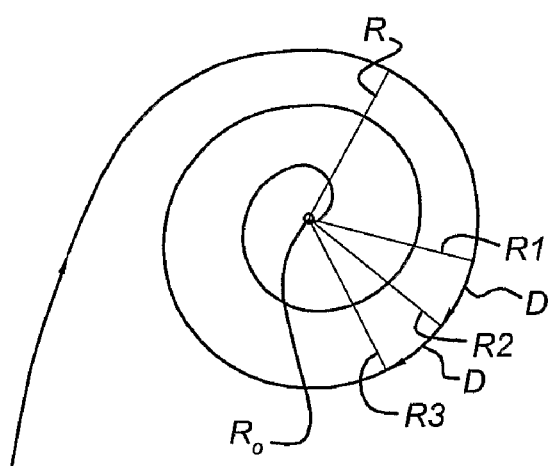

The solution according to FIGS. 9a and 9b is based on the insight that when a driver turns his steering wheel to drive a vehicle into a curve or to come out of a turn a most natural way of doing so is to do this in such way that the vehicle follows a clothoide form curve. Moreover, curves in roads are nowadays required by law to be designed in a clothoide form since this curve form allows a driver to drive with a highest possible speed through the curve. If not, a driver can only drive through a curve with a limited speed to avoid dangerous situations.

Inputs to the calculation are again the heading and distance. The calculation is made sample by sample. By using the method explained with reference to FIGS. 9a and 9b, a more accurate estimation of the true trajectory as traveled by the MMS system is achieved than is possible with the prior art method.

The result is an estimated trajectory based on a concatenation of a plurality of curves Tappr2.

Calculating Orientation about X-Axis and Y-Axis, Slopes Local Gravity and Z-Level.

Above, it has been explained how a "shape filter" can be applied to remove inaccurate GPS samples from a series of GPS samples, including inaccurate GPS samples due to multipath errors. Moreover, by iteratively comparing the approximated trajectory with the trajectory as determined from the GPS samples, drift due to the IMU system can be cancelled out. By doing so, it has been shown that an accurate approximation of a trajectory in a 2D world can be determined. However, the real world is 3D and most applications based on for instance measurements by the MMS system shown in FIG. 1 need 3D data as well. Such 3D data include orientation about the x-axis and y-axis and z-level of the MMS system along the traveled road. However, another important parameter may be the angle of slope relative to a local gravity vector. Note that the local gravity vector does not need to coincide with a vector directed to the earth's centre. This is especially true in the mountains where the mass of the mountains cause local deviations of the gravity vector from the vector directed to the earth's centre. Differences may be as high as 2%. For trucks, for instance, it is not so important how the earth's centre vector is directed but how the local gravity vector is directed. Only the local gravity vector determines the gravity force applied to the truck. This is of growing interest to the trucks industry.

The GPS sensors do not provide the local gravity vector. They only provide data as to the vector directed to the earth's centre.

In principle, the IMU sensors can measure the local gravity vector in stationary situations. In dynamic situations, the IMU measures a superposition of gravity forces and inertial forces. So in dynamic situations, when one tries to measure the gravity vector one needs to remove all dynamic forces from the IMU readings.

Basically, the method proposed here is as follows:
the IMU system provides measurements as to gravity plus all movement accelerations in a dynamical situation since the MMS system is driving while collecting data;
however, the DMI system measures speed, and thus the processor 11 can derive movement accelerations of the MMS system in the x-direction (note that the x-direction is not a fixed x-direction but relative to the movement of the IMU system as mounted in the MMS system along the road; similarly the y-direction is locally defined as being perpendicular to the x-direction and in the road's surface);
so, the processor 11 can remove the movement acceleration as derived from the DMI system from the measurements made by the IMU system, rendering the gravity vector via the pitch and roll of the MMS system as a function of time.

This will now be explained in a mathematical way.

Having established precise heading data, and calibrated the DMI system, the processor 11 can derive very precise dynamic accelerations that are influencing accelerometer readings. These accelerations can be described by the equations below:

$$\vec{a}_x = d\vec{v}_x/dt \quad (9)$$

$$\vec{a}_y = \vec{\omega}_z \times \vec{v}_x \quad (10)$$

where:

$\vec{a}_x$ equals the acceleration in the direction of travel of the MMS system;

$\vec{v}_x$ is the velocity of the MMS system in the x-direction as derived from the DMI system $\vec{a}_y$ equals the acceleration as measured in the direction perpendicular to the direction of travel of the MMS system and perpendicular to the local gravity vector;

$\vec{\omega}_z$ is the speed of heading change of the MMS derived from the 2D method described above;

Removal of the horizontal accelerations and additionally, the vertical accelerations can be derived from the following equation:

$$\vec{a}_z = \vec{\omega}_y \times \vec{v}_x \quad (11)$$

where:

$\vec{a}_z$ equals the acceleration in the direction opposite to the local gravity vector;

$\vec{\omega}_y$ equals the pitch of the MMS system relative to the local gravity vector.

This gives the processor 11 an opportunity to remove the major components of dynamic acceleration. Producing in this way "stationary like" readings $$\vec{a}_{STx} = \vec{a}_{IMUx} - \vec{a}_x \quad (12)$$

$$\vec{a}_{STy} = \vec{a}_{IMUy} - \vec{a}_y \quad (13)$$

$$\vec{a}_{STz} = \vec{a}_{IMUz} - \vec{a}_z \quad (14)$$

where:

$\vec{a}_{IMUx}$ equals the acceleration measured by the IMU system in x axis $\vec{a}_{STx}$ equals stationary (removed dynamic) acceleration in x axis $\vec{a}_{IMUy}$ equals the acceleration measured by the IMU system in y axis $\vec{a}_{STy}$ equals stationary (removed dynamic) acceleration in y axis $\vec{a}_{IMUz}$ equals the acceleration measured by the IMU system in z axis $\vec{a}_{STz}$ equals stationary (removed dynamic) acceleration in z axis These "stationary like" values will be unbiased estimations of local gravity reading, however still having some white noise caused by vibration of the MMS system while travelling along the road. Average of this noise component over time will be equal to zero. So, averaging can be used to cancel this white noise from the signal.

Now, pitch and roll can be obtained from the following equations:

$$\sin(pitch_{acc}) = \frac{a_{STx}}{\sqrt{a_{STx}^2 + a_{STy}^2 + a_{STz}^2}}, \quad (15)$$

$$\sin(roll_{acc}) = \frac{a_{STy}}{\sqrt{a_{STx}^2 + a_{STy}^2 + a_{STz}^2}} \quad (16)$$

The values of $pitch_{acc}$ and $roll_{acc}$ derived from equations (15) and (16), are unbiased approximations of pitch and roll of the orientation of the IMU system based on acceleration measurements. However, since they are derived from noisy data, they will also be noisy data.

To estimate the true values of pitch and roll of the IMU orientation, the processor 11 can use the method as described in the 2D section above in an analogical way. Above it has been explained how drift can be removed in the estimation of the vehicle heading $\vec{\omega}_z$. Now, processor 11 uses $pitch_{acc}$ and roll$_{acc}$ respectively as reference data and calculates the drift in the IMU parameters $\vec{\omega}_y$, and $\vec{\omega}_x$ respectively.

Figure 10A:
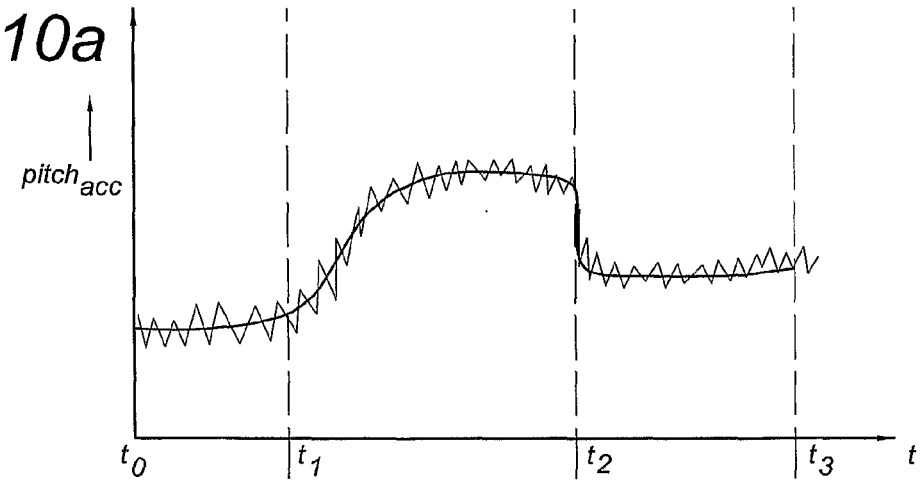
FIGS. 10a, 10b and 10c show curves to clarify how drift (and other shifts) in an IMU pitch signal can be estimated.

FIG. 10a shows the resulting approximated pitch value pitch$_{acc}$ for a time window t0-t3. In the example, pitch$_{acc}$ rises at a moment t1 and decreases at a moment t2. The signal shown is provided with noise due to the MMS system vibrations during travelling on the road.

Now, the processor 11 can derive the true values of pitch and roll orientation of the IMU system, with respect to the gravity vector. In the description below, these values will be referred to as pitch$_{true}$ and roll$_{true}$, respectively.

Figure 10B:
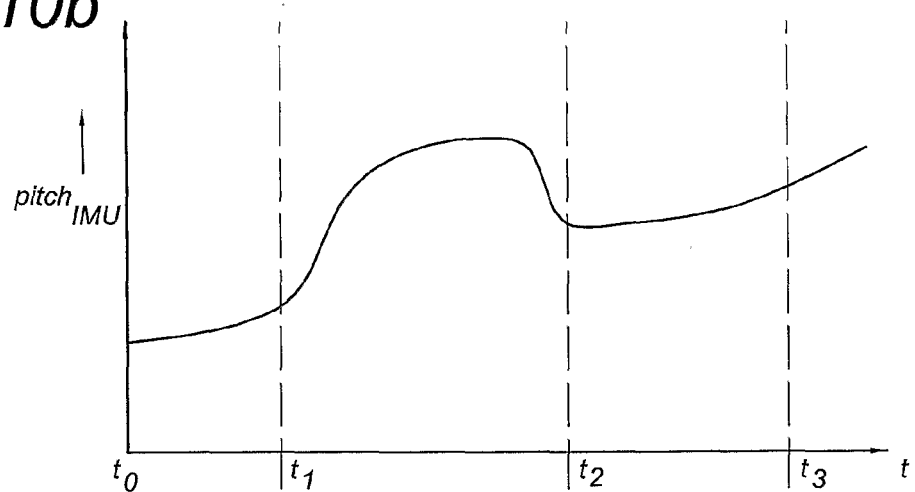

Processor 11 obtains the pitch value about the y axis by acceleration measurements made by the IMU system. By a double integration the processor 11 derives a calculated pitch, pitch$_{IMU}$, from this acceleration measurements. The result is shown in FIG. 10b. As shown the calculated pitch pitch$_{IMU}$ is not provided with noise but it is provided with a drift caused by the double integration.

Next, processor 11 subtracts the curve shown in FIG. 10a from the curve shown in FIG. 10b. This produces the curve shown in FIG. 10c. The curve shown in FIG. 10c should show the drift in the pitch as measured by the IMU system having some noise added to it. So, for instance by using averaging techniques or local linear regression, the processor 11 removes the noise from the signal shown in FIG. 10c rendering the drift in the pitch resulting from the IMU measurements. Now, the processor 11 can compensate the drift from the pitch resulting from the measurements by the IMU system. This delivers an accurate pitch, pitch$_{true}$.

Figure 10C:
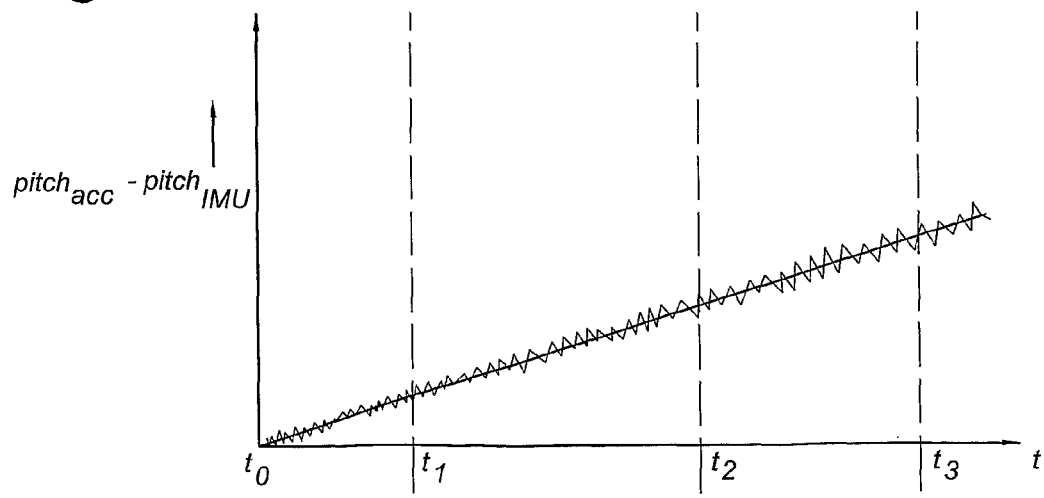

Now, the processor 11 can also calculate an accurate roll, roll$_{true}$, in the same way as explained with respect to the pitch, pitch$_{true}$ (cf. FIGS. 10a-10c).

Calculating Slope

In principle, the stationary IMU sensors can measure the local gravity vector, that is, the local gravity vector is known once the pitch and roll relative to the local gravity vector are known. In the section above we presented a method on how to measure the local gravity vector in a dynamic situation. To further calculate slope out of these readings one needs to take into account additional dynamic properties of the vehicle. For example, if a car has a relatively short length, or the IMU system is not precisely mounted to the vehicle body, the measured local gravity vector may be accurate but the angle of the slope may still be very inaccurate. This can, of course be avoided by measuring with a very long car (or truck), and precisely mounting the IMU system to the vehicle but that is impractical. Moreover, this can be avoided by measuring with the IMU sensors while the car is driving but then the measurements may suffer too much from drifts in the IMU output.

Figure 11:
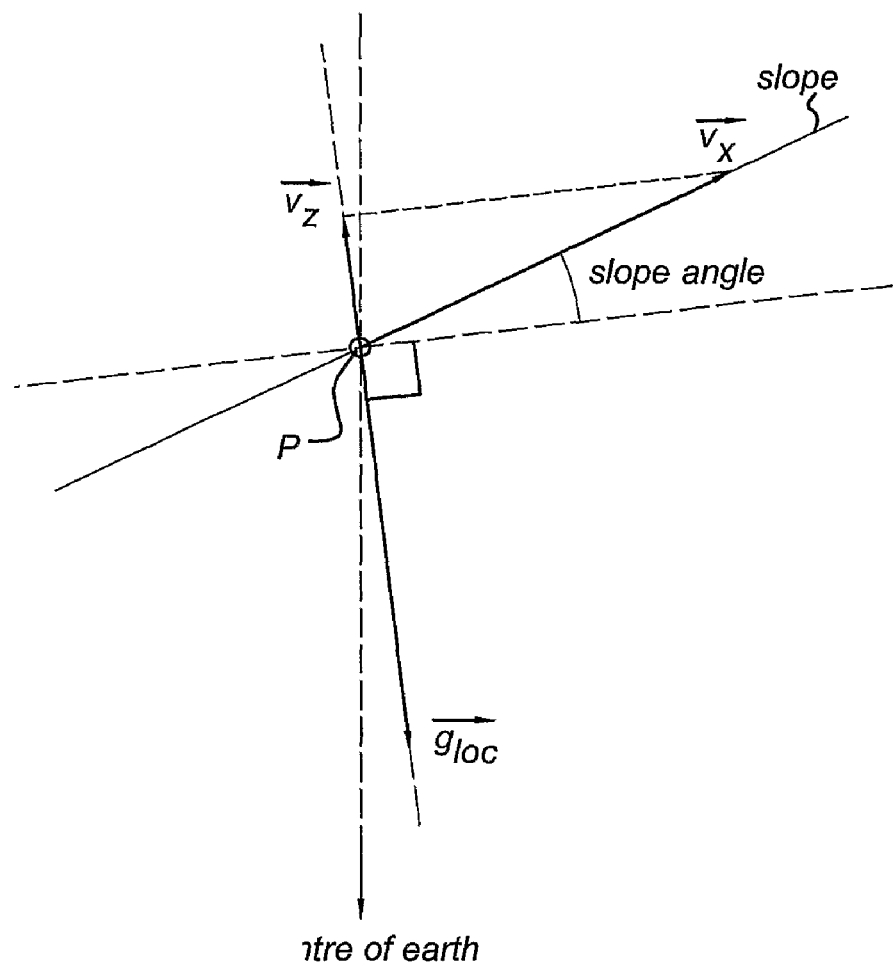
FIG. 11 shows how a slope is defined relative to a local gravity vector.

FIG. 11 shows some relevant parameters for calculation of slope relative to gravity. The MMS system is assumed to be at point P on a slope. The MMS system is driving with a speed $\vec{v}_x$ which is measured by the DMI system (remember that the x-direction is relative to the moving coordinate system defined by the MMS itself, so the x-direction is along the slope itself). For the purpose of the explanation, the local gravity vector $\vec{g}_{loc}$ is shown with a relatively large deviation from the direction to the centre of the earth: in most cases this deviation will not be more than 2%. The driving speed $\vec{v}_x$ can be decomposed in a "vertical" speed $\vec{v}_z$ in a direction of the local gravity vector $\vec{g}_{loc}$ and a speed perpendicular to this vertical speed $\vec{v}_z$ (this latter perpendicular speed is not drawn in FIG. 11). So, the following equation holds:

$$\text{slope\_angle} = \arcsin(v_z/v_x) \tag{17}$$

The vertical speed $v_z$ can also be derived from the measurements made by the IMU stationary system which measures the vertical stationary acceleration $\vec{a}_{STz}$ in the direction of the local gravity vector $\vec{g}_{loc}$. The following equation holds:

$$\vec{v}_z = \int \vec{a}_{STz} \cdot dt \tag{18}$$

The result of this equation shows some drift but can well be used over small distances. The value of the vertical speed $v_z$ as derived from equation (18) can be substituted in equation (17). Moreover, the driving speed $\vec{v}_x$ as known from the DMI system can be substituted in equation (17).

In other words, by obtaining the driving speed $\vec{v}_x$ from the DMI measurements, calculating the vertical speed $v_z$ from the IMU stationary measurement as to the vertical acceleration $\vec{a}_{STz}$ and applying equation (17), processor 11 calculates the slope angle relative to the local gravity vector $\vec{g}_{loc}$.

In a first alternative, the processor 11 uses the following equation to calculate the slope angle:

$$v_z = v_x \cdot \sin(\text{pitch}_{true} - k \cdot a_x) \tag{19}$$

where:
pitch$_{true}$=pitch, which is available from the calculations explained above;
a$_x$=acceleration in the x-direction, which is available from the DMI system;
k=a constant. The value of k can be found by testing and depends on the mass-spring behaviour of the MMS system.

It is observed that equation (19) is known as such from the prior art. What is new, however, is the insight that this equation determines the slope angle relative to the local gravity vector $\vec{g}_{loc}$ and that the processor 11 can, thus, easily calculate this slope.

In a second alternative, the processor 11 uses both equations (17) and (19) to calculate the slope and does not use the IMU measurements to obtain the vertical speed $v_z$. Equation (19) is used to remove drift (or other errors) from the value obtained by equation (18) and renders an error compensated vertical speed value $v_{z,err\_comp}$. Thus, the drift in determining the vertical speed $v_z$ from the IMU system can be avoided. So, such method provides the processor 11 with another way of calculating the vertical speed $v_z$ relative to the local gravity vector $\vec{g}_{loc}$, i.e., in the form of $v_{z,err\_comp}$. Once having calculated the error compensated vertical speed $v_{z,err\_comp}$ in this way, the processor 11 uses equation (17) to calculate the slope angle, where in equation $v_{z,err\_comp}$ is used instead of $v_z$.

Although, here, the slope calculation is presented to be based on equation (17), in general, the calculation of the slope relative to the local gravity vector may be based on any equivalent equation where measurements of the DMI system and the IMU system are used and where it is recognized that the measurements of the IMU system are made relative to the local gravity vector.

Moreover, it observed that calculating the slope relative to the local gravity vector is regarded as a separate invention, distinct from any invention in the 2D plane, such as removing inaccurate GPS samples. Once having a reasonably accurate set of GPS samples, one can calculate the slope in the way described above. This set of GPS samples need not be obtained in the way explained in this document.

Calculating Z-Level.

Now, processor 11 can easily calculate the relative z-level of the MMS system as a function of time using the following equation:

$$z(t) = \int v_x(t) \cdot \sin(\text{slope\_angle}(t)) \qquad (20)$$

where: z(t) is relative z-level in the direction of the local gravity vector $\vec{g}_{loc}$.

This relative z-level can be used by processor 11 to calculate an absolute z-level, i.e., a z-level above sea level as measured in a z-direction opposite to the earth's centre direction. To that end, processor 11 can be arranged to derive a shift vector used to shift each relative z-level value to an absolute sea level value. Such shift vectors can, for instance, be obtained by processor 11 by averaging all GPS $z_{GPS}(t)$ readings that the 2D method explained above has identified as good resulting in an average value, and subtracting from this average value the average of the corresponding relative z(t) values.

The invention claimed is:

1. A computer arrangement for determining and correcting for inaccurate global positioning system samples comprising:
    a processor arranged to communicate with a memory storing a computer program comprising instructions and data that can be run by the processor, said processor being arranged to perform at least the following actions when it runs said computer program:
      a) obtaining global positioning system samples as taken by a global positioning system on board a land based vehicle when traveling along a trajectory;
      b) obtaining a first estimation of said trajectory based on said global positioning system samples;
      c) obtaining a second estimation of said trajectory at least based on measurements made by an inertial measurement unit on board said land based vehicle when traveling along said trajectory;
      d) comparing said first and second estimations;
      e) establishing locations where said first estimation shows a variation compared with said second estimation above a predetermined threshold;
      f) if no such locations can be established continue with action j), otherwise continue with action g);
      g) removing global positioning system samples associated with said locations of high variation as being inaccurate global positioning system samples, thus forming a set of remaining global positioning system samples;
      h) calculating said first estimation anew of said trajectory based on said remaining global positioning system samples and calculating said second estimation anew;
      i) repeating actions d) to h); and
      j) ending said actions.

2. The computer arrangement according to claim 1, wherein said computer arrangement is arranged to test in action j) before ending said actions whether a predetermined criterion is met, and if said predetermined criterion is not met to repeat actions d) to h), said predetermined criterion including at least one of: a minimum distance traveled by said vehicle and a minimum time period of travel of the vehicle.

3. The computer arrangement according to claim 2, wherein the processor is arranged to check said predetermined criterion of minimum distance traveled by said vehicle based on distance measurements made by a distance measurement instrument on board said vehicle.

4. The computer arrangement according to claim 2, wherein said minimum distance is 100 meters.

5. The computer arrangement according to claim 1, wherein said second estimation of said trajectory is also based on measurements made by a distance measurement instrument on board said land based vehicle when traveling along said trajectory.

6. The computer arrangement according to claim 1, wherein said second estimation of said trajectory is also based on measurements as to direction of travel by said vehicle as measured by said global positioning system on board said land based vehicle when traveling along said trajectory.

7. The computer arrangement according to claim 1, wherein said second estimation of said trajectory is also based on measurements as to speed of travel by said vehicle as measured by said global positioning system on board said land based vehicle when traveling along said trajectory.

8. The computer arrangement according to claim 1, wherein said processor is arranged to perform at least the following actions any time before it performs action d) when it runs said computer program:
    obtaining a first parameter as a function of time associated with a portion of said trajectory traveled by said vehicle, said first parameter being one of a group of parameters comprising: x value, y valve, z value, orientation in xy plane, roll and pitch, as defined in an xyz system, said first parameter being obtained from a first measurement system on board said vehicle while traveling along said portion of said trajectory;
    obtaining a second parameter as a function of time associated with said portion of said trajectory traveled by said vehicle, said second parameter being an equivalent of said first parameter but obtained from said measurements made by said inertial measurement unit;
    comparing said first and second parameters as a function of time and deducing from said comparing a measurement error in said second parameter in said portion of said trajectory; and
    compensating an error in said second estimation of said trajectory due to said measurement error in said second parameter.

9. The computer arrangement according to claim 8, wherein said first measurement system is said global positioning system.

10. The computer arrangement according to claim 8, wherein said measurement error relates to at least one of drift and shifts in said measurements made by said inertial measurement unit.

11. The computer arrangement according to claim 1, wherein said processor is arranged to, in said action of obtaining said second estimation of said trajectory, calculate successive locations of said trajectory and interpolating between said locations while using a clothoide shaped approximation between said locations.

12. The computer arrangement according to claim 1, wherein the processor is arranged to calculate an orientation of said vehicle in an xy plane when traveling along said trajectory as function of time, said xy plane being defined locally by an x-axis and an y-axis, said x-axis being along said trajectory and said y-axis being perpendicular to said x-axis and to a local gravity vector, while performing at least the following actions:
    estimating a first orientation signal as a function of time based on said remaining global positioning system samples;

estimating a second orientation signal as a function of time based on orientation measurements made by said inertial measurement unit;

comparing the first orientation signal and the second orientation signal as a function of time;

deriving an error in said second orientation signal as a function of time based on said comparing action;

compensating said error in said second orientation signal thus rendering an error compensated second orientation signal; and calculating said orientation of said vehicle as a function of time along the traveled trajectory based on the first orientation signal and the error compensated second orientation signal.

13. The computer arrangement according to claim 12, wherein said processor is arranged to calculate a first estimation of at least one of a pitch and roll of said vehicle while traveling along said trajectory as a function of time, in accordance with at least the following actions:

obtaining measurement data from said inertial measurement unit as to movement accelerations;

obtaining speed measurement data in said x-direction from a distance measurement unit on board said vehicle;

deriving movement accelerations of the vehicle in said x-direction; and removing the movement acceleration from the measurements made by the IMU system, rendering the acceleration.

14. The computer arrangement according to claim 13, wherein said processor is arranged to calculate an approximation of at least one of pitch and roll of said vehicle while traveling along said trajectory as a function of time, while performing at least the following actions:

calculating:

$$\vec{a}_x = d\vec{v}_x/dt \tag{9}$$

$$\vec{a}_y = \vec{\omega}_z \times \vec{v}_x \tag{10}$$

where:

$\vec{a}_x$=acceleration in the x-direction;

$\vec{v}_y$=velocity in the x-direction as derived from the distance measurement unit;

$\vec{a}_y$=acceleration as measured in the y-direction;

$\vec{\omega}_z$=speed heading change;

calculating:

$$\vec{a}_z = \vec{\omega}_y \times \vec{v}_x \tag{11}$$

where:

$\vec{a}_z$ equals the acceleration in the direction opposite to the local gravity vector;

$\vec{\omega}_y$ equals the pitch of the vehicle system relative to the local gravity vector, calculating:

$$\vec{a}_{STx} = \vec{a}_{IMUx} - \vec{a}_x \tag{12}$$

$$\vec{a}_{STy} = \vec{a}_{IMUy} - \vec{a}_y \tag{13}$$

$$\vec{a}_{STz} = \vec{a}_{IMUz} - \vec{a}_z \tag{14}$$

where:

$\vec{a}_{IMUx}$=acceleration measured by the inertial measurements unit in x axis $\vec{a}_{STx}$=stationary acceleration in x axis $\vec{a}_{IMUy}$=acceleration measured by the inertial measurements unit in y axis $\vec{a}_{STy}$=stationary acceleration in y axis $\vec{a}_{IMUz}$=acceleration measured by the inertial measurements unit in z axis $\vec{a}_{STz}$=stationary acceleration in a axis calculating at least one of:

$$\sin(pitch_{app}) = \frac{a_{STx}}{\sqrt{a_{STx}^2 + a_{STy}^2 + a_{STz}^2}} \tag{15}$$

$$\sin(roll_{app}) = \frac{a_{STy}}{\sqrt{a_{STx}^2 + a_{STy}^2 + a_{STz}^2}} \tag{16}$$

where:

$pitch_{app}$=approximation of pitch $roll_{app}$=approximation of roll.

15. The computer arrangement according to claim 14, wherein said processor is arranged to calculate an estimation of said at least one of pitch and roll from said measurements made by said inertial measurement unit, to compare said approximation of said at least one of pitch and roll with said estimation of said at least one of said pitch and roll and to compensate errors in said estimation of said at least one of pitch and roll based on said comparison, in order to render at least one of a true pitch, defined as an error compensated pitch, and a true roll, defined as an error compensated roll.

16. The computer arrangement according to claim 15, wherein the processor is arranged to calculate a slope angle slope_angle of said vehicle while travelling along said trajectory relative to a local gravity vector ($\vec{g}_{loc}$) in accordance with:

$$slope\_angle = \arcsin(v_z/v_x) \tag{17}$$

$$v_z = v_x \sin(pitch_{true} - ka_x) \tag{19}$$

where:

$v_z$=velocity in a direction opposite to said local gravity vector;

$pitch_{true}$=true pitch;

$a_x$=acceleration in x-direction as derived from the distance measurement unit; and k=a constant.

17. The computer arrangement according to claim 14, wherein the processor is arranged to calculate a slope angle slope_angle of said vehicle while travelling along said trajectory relative to a local gravity vector $<\vec{g}_{loc}>$ in accordance with:

$$slope\_angle = \arcsin(v_z/v_x) \tag{17}$$

where:

$v_z$=velocity in a direction opposite to said local gravity vector calculated from:

$$\vec{v}_z = \int \vec{a}_{STx} \cdot dt \tag{18}.$$

18. The computer arrangement according to claim 17, wherein the processor is arranged to:

calculate:

$$v_z = v_x \sin(pitch_{true} - ka_x) \tag{19}$$

where:

pitch$_{true}$=true pitch;

a$_x$=acceleration in x-direction as derived from the distance measurement unit; and k=a constant;

use equation (19) to remove errors from v$_2$ as obtained by equation (18) rendering an error compensated vertical speed value v$_{z,err\_comp}$; and substitute a in equation (17) by the error compensated vertical speed v$_{z,err\_comp}$.

19. The computer arrangement according to claim 17, wherein the processor is arranged to calculate a z-level z(t) in a direction opposite to said local gravity vector $<\vec{g}_{loc}>$ from:

$$z(t)=\int v_x(t)\cdot\sin(\text{slope\_angle}(t)) \qquad (20).$$

20. A method of determining inaccurate global positioning system samples, said method comprising:
    a) obtaining global positioning system samples as taken by a global positioning system on board a vehicle when traveling along a trajectory;
    b) obtaining a first estimation of said trajectory based on said global positioning system samples;
    c) obtaining a second estimation of said trajectory at least based on measurements made by an inertial measurement unit on board said vehicle when traveling along said trajectory;
    d) comparing said first and second estimations;
    e) establishing locations where said first estimation shows a variation compared with said second estimation above a predetermined threshold;
    f) if no such locations can be established continue with action j), otherwise continue with action g);
    g) removing global positioning system samples associated with said locations of high variation as being inaccurate global positioning system samples, thus forming a set of remaining global positioning system samples;
    h) calculating said first estimation anew of said trajectory based on said remaining global positioning system samples and calculating said second estimation anew;
    i) repeating actions d) to h); and j) ending said actions.

21. A non-transitory computer storage medium containing a computer program product comprising instructions and data that can be loaded by a computer arrangement to allow said computer arrangement to perform the method of claim 20.

\* \* \* \* \*